United States Patent [19]

Gorchev et al.

[11] 4,100,964
[45] Jul. 18, 1978

[54] INDUCTION VENTILATION SYSTEM

[75] Inventors: Dimiter Gorchev, Washington, D.C.; John D. McGraw, Stow, Mass.

[73] Assignee: Mitco Corporation, Somerville, Mass.

[21] Appl. No.: 672,125

[22] Filed: Mar. 31, 1976

[51] Int. Cl.² ............................................. B60H 1/00
[52] U.S. Cl. ...................................... 165/40; 165/123
[58] Field of Search ............... 165/123, 124, 125, 126, 165/40

[56] References Cited

U.S. PATENT DOCUMENTS

| | | | |
|---|---|---|---|
| 1,878,012 | 9/1932 | Stacey | 165/123 |
| 2,144,466 | 1/1939 | Stikeleather | 165/123 |
| 2,463,322 | 3/1949 | Sewell | 165/123 |
| 2,492,757 | 12/1949 | Meek | 165/123 |
| 2,850,242 | 9/1958 | Newton | 165/123 |
| 2,913,227 | 11/1959 | Bottorf | 165/123 |
| 2,932,956 | 4/1960 | Chieregatti | 165/123 |
| 3,018,088 | 1/1962 | Allander | 165/123 |
| 3,032,323 | 5/1962 | Church | 165/123 |
| 3,208,508 | 9/1965 | Bryans | 165/123 |
| 3,213,928 | 10/1965 | Anderson | 165/123 |
| 3,217,788 | 11/1965 | Adam | 165/123 |
| 3,259,178 | 7/1966 | Tarnoff | 165/123 |
| 3,263,743 | 8/1966 | Baumgarten | 165/123 |
| 3,288,205 | 11/1966 | Egbert | 165/123 |
| 3,445,317 | 9/1967 | Marshall et al. | 165/40 |
| 3,623,542 | 11/1971 | Fragnito | 165/123 |
| 3,734,192 | 5/1973 | Dean | 165/123 |
| 3,777,806 | 12/1973 | Tailor | 165/123 |
| 3,841,392 | 10/1974 | Osheroff | 165/123 |

Primary Examiner—Charles J. Myhre
Assistant Examiner—Margaret A. LaTulip
Attorney, Agent, or Firm—Kenway & Jenney

[57] ABSTRACT

An induction ventilation system for one or more zones. For each zone, the system includes a heat exchanger, a means for driving a heating or cooling liquid through the heat exchanger, an adjustable flow rate primary air injector and a secondary air induction inlet, and a zone temperature control. The temperature control is selectively operative to control the injector to vary the flow rate of primary air in response to sensed temperature in the zone. The temperature control is further selectively operative to maintain the flow rate of the heating or cooling liquid to be relatively constant in one form of the invention, or to vary in response to sensed temperature in the zone in another form of the invention.

9 Claims, 8 Drawing Figures

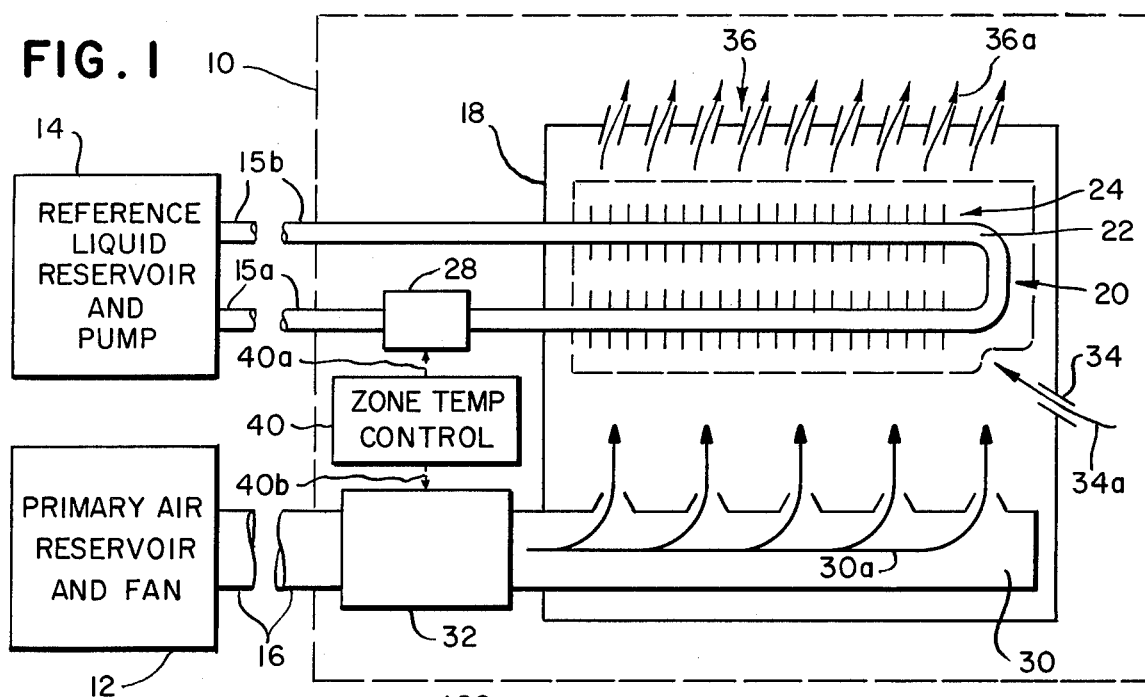
FIG. 1
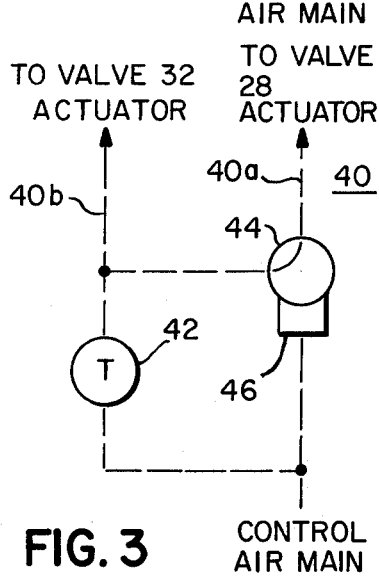
FIG. 2
FIG. 3
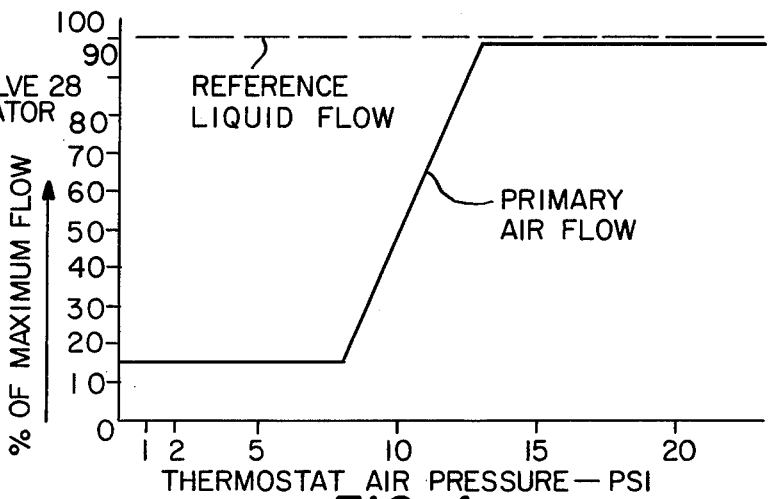
FIG. 4
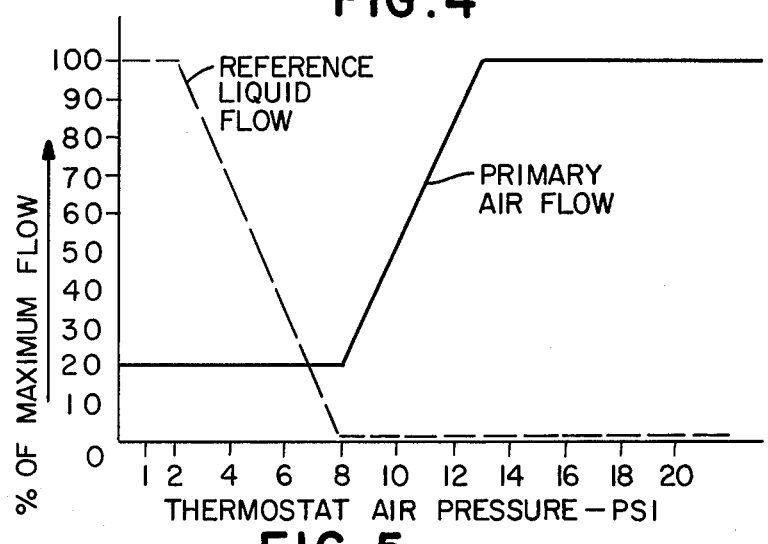
FIG. 5

INDUCTION VENTILATION SYSTEM

BACKGROUND OF THE INVENTION

This invention relates to ventilation systems, and more particularly, to induction ventilation systems.

Conventional induction ventilation systems inject a constant volume flow of primary air into a room or zone induction unit duing all periods of operation. In such systems, the primary air flows through the induction nozzles in the induction unit, thereby causing secondary air from the zone to be induced into the induction unit. The combined air flow passes at a relatively fixed flow rate over a heat exchanger and then from the induction unit into the zone. Generally, the heat exchanger includes a central core portion, such as a water coil, and a plurality of convection elements connected thereto in order to promote relatively efficient heat exchange between the primary and secondary air and water passing through the coil. The flow of water through the heat exchanger is generally controlled by a pneumatically operated valve which is modulated in response to a pneumatic thermostatic device to achieve a desired temperature control for the zone.

During the cooling season, a constant flow rate of primary air is supplied to the zone induction unit, and a flow of cold water is supplied to the coil at a rate which is modulated to provide a desired cooling capacity. Typically, prior art systems utilize a water valve at the water coil which is normally open, with a thermostatic device causing the valve to close partially depending on the temperature within the zone. In this cooling mode, an increase in temperature in the zone causes a decrease in control air pressure to the thermostat with a resultant increase in chilled water flow through the heat exchanger.

During the heating season, prior art systems supply a constant volume of primary air to the zone induction unit while the water supply to the coil is maintained at a relatively high temperature through the passage of hot water. The action of the thermostatic device is changed with respect to the cooling system operation in order to be direct acting, whereby a decrease in temperature causes a decrease in thermostat air pressure, which in turn opens the valve to the water coil with a resultant increase in hot water flow to the heat exchanger.

With these configurations, prior art systems are subject to substantial disadvantages. First the same volume of primary air must be continually conditioned from its ambient condition. Since typical systems utilize outside air for the primary air, there is often a relatively large temperature differential required to transform that air to the desired room temperature. As a result, the energy consumption in conditioning this relatively large volume of air is relatively high. Furthermore, relatively large amounts of energy are required to continually drive this air past the heat exchanger.

Accordingly, it is an object of the present invention to provide an induction ventilation system with relatively low energy demands compared with prior art systems.

Another object of the present invention is to provide an induction ventilation system utilizing a selectively controlled flow rate of primary air.

SUMMARY OF THE INVENTION

In accordance with the present invention, an induction ventilation system is provided for one or more zones or rooms, each having at least one heat exchanger and associated primary air injector and secondary inlet. Each heat exchanger may include a plurality of conduction elements and a tubular core portion characterized by a high thermal conductivity and with the convection elements and core portions being thermally coupled with a relatively high coupling coefficient. The system further includes a pump for driving a reference liquid, such as water, from a liquid reservoir through each of the core portions. The primary air injectors each include a means for adjustably injecting primary air from a primary air reservoir at a controlled flow rate. The secondary air inlet is coupled to the primary air injector so that a secondary air flow is induced from the zone in response to the injected primary air. The combined secondary and primary air flow are directed across the convection elements and into the room. As a result, the temperature of the primary and secondary air mixture is convectively modified by heat exchange with the convection elements.

The system further includes a zone temperature control associated with at least one heat exchanger. The temperature control includes a means operative in a first mode to establish a substantially constant rate flow of the reference liquid through each core portion. The temperature control further includes a selectively operated means for adjusting the flow rate of the primary air into the zone, which in turn controls the rate of flow of secondary air into the zone.

As a result of this configuration, a maximum flow of the reference liquid through the core portions may be maintained at all times, while the air flow rate is controlled by a variable volume air flow control valve in the primary air flow path. For a thermostatically controlled system, as more change in temperature is required, a normally closed air valve opens to increase the supply of primary air, thereby increasing the forced convection heat transfer interaction with the heat exchanger. When minimum change in temperature is required, the primary air valve throttles the primary air supply to a minimum, thereby sufficiently decreasing the induced air flow and the heat transfer at the heat exchanger. As a result, the primary air flow is modulated to control change in temperature as opposed to the prior art systems wherein only the reference fluid flow rate is controlled with the primary air flow being maintained at a maximum level. Of course, the system may be configured as a heating or cooling system by respectively providing relatively hot water to the heat exchanger or relatively cold water to the heat exchanger.

With this configuration, a minimum air flow (both primary and secondary) is required to establish the desired temperatures compared with that required for prior art systems. As a result, a smaller net amount of heat must be transferred between the primary and secondary fluids and the reference liquid in the heat exchanger. Furthermore, the fan horsepower demand for driving the air flow is only a fraction of that required for the prior art constant air volume systems.

The present invention may also be operated in a manner providing improved range and resolution temperature control. For example, a system may be configured which includes controls for both the primary air flow and also the reference liquid flow. By suitable arrangement of the operational range of these controls, increased range (where the primary air flow control and reference liquid control are entirely non-over-lapping), increased resolution (where the primary air flow control and reference liquid control are entirely over-lapping), or any combination thereof may be attained.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1 shows an induction ventilating system in accordance with the present invention;

FIGS. 2 and 3 show, in schematic form, the zone temperature control of the embodiment of FIG. 1; and FIGS. 4 and 5 illustrate the operation of the embodiment of FIGS. 1-4.

BRIEF DESCRIPTION OF THE PREFERRED EMBODIMENT

Figure 6:
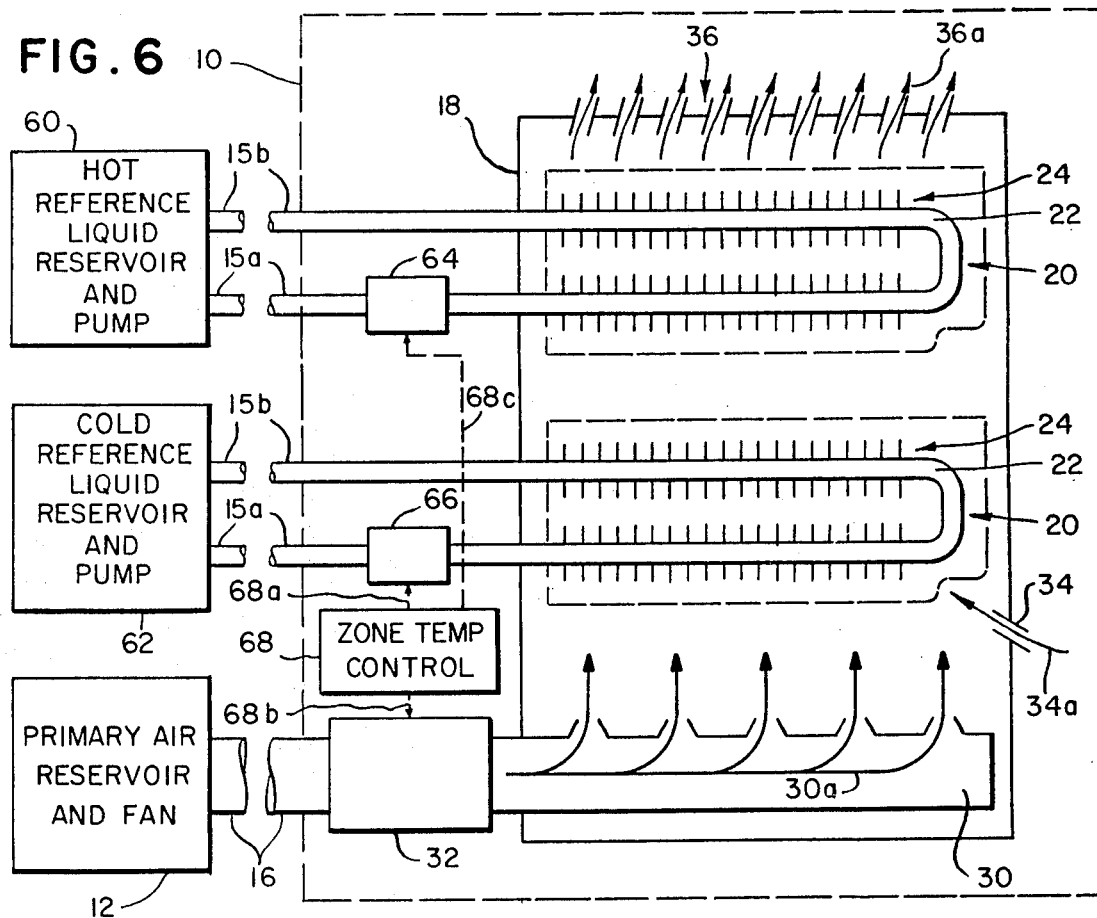
FIG. 6 shows an alternative embodiment of the present invention.

An induction ventilation system in accordance with the present invention is shown in schematic form in FIG. 1. In that figure, the system is shown for a single zone (or room) 10 and includes a primary air reservoir and fan 12 and a reference liquid reservoir and pump 14. The primary air reservoir and fan 12 may comprise a vent to outside air and a means for driving the air through primary air duct 16 to a zone ventilator 18 in the zone to be ventilated. The reference liquid reservoir and pump 14 may be conventional elements which provide a flow of a reference liquid, such as water, by way of fluid lines 15a and 15b through a network of heat exchangers associated with the ventilating system. For the present embodiment, it is assumed that the reference liquid is maintained at a desired operating temperature in the reservoir 14 by conventional means, for example, for the temperature being relatively low with respect to the primary air temperature for cooling operation, and being relatively high for heating operation.

As illustrated, zone ventilator 18 includes a heat exchanger 20 having a core portion 22 and a plurality of convective elements 24 in relatively good thermal contact with the core portion 22. The core portion 22 is connected in series with a reference liquid valve 28 in a manner establishing a flow path for the reference liquid from reservoir 14 and fluid lines 15a and 15b.

Zone ventilator 18 further includes an associated primary air injector 30 connected with the primary air duct 16, and an adjustable flow rate primary air valve 32. The injector 30, as illustrated, includes a plurality of nozzles arranged to inject primary air across the convection elements of heat exchanger 20 and through a plurality of output ports 36 in the ventilator 18 and into zone 10. The zone ventilator 18 further includes one or more secondary air inlet ports (exemplified by port 34 in FIG. 1) which are arranged so that passage of primary air through the injection nozzles of injector 30 induces a flow of secondary air from zone 10 through the inlet ports and across heat exchanger 20 and into zone 10. The ventilator 18 with heat exchanger 20 and injector 30 and induction inlet port 34 may be configured from well-known conventional components.

In FIG. 1, the primary air flow through injector 30 is indicated by arrows 30a, the secondary air flow through port 34 is indicated by arrow 34a, and the combined primary and secondary air flow into zone 10 is indicated by arrows 36a.

The system of FIG. 1 also includes zone temperature control 40 which controls the operation of valves 28 and 32 as indicated by the dashed arrow 40a and 40b, respectively. Valve 32 is selectively operated by control 40 to adjust the flow rate of primary air from duct 16 into injector 30. Since the flow of secondary air through inlet port 34 is related to the flow of primary air from injector 30, the valve 32 thereby controls the rate of flow of primary and secondary air across the heat exchanger 20 and into zone 10. The valve 28 may also be responsive to zone temperature control 40 to control the flow rate of the reference liquid through the core portion of heat exchanger 20.

In one form of the invention, the valve 28 provides a relatively constant flow rate of the reference liquid through core portion 22 by remaining in the flow open state, thereby permitting "wild flow" through the heat exchanger 20. Of course, in this embodiment, the valve 28 may just be a "straight-through" connection between core portion 22 and the fluid line 15a connecting reservoir 14. In this configuration, the heat capacity of the composite primary and secondary air flow 36a into zone 10 is controlled by the operation of valve 32 which is responsive to zone temperature control 40 since those components control the rate of flow of that composite air stream across heat exchanger 20. In alternative forms of the invention, the valve 28 may also be operated in conjunction with the valve 32 to provide control of the heat capacity of the composite air stream 36a.

FIGS. 2 and 3 illustrate an exemplary configuration for zone temperature control 40 of FIG. 1 which is suitable for a two-season operation, i.e. heating and cooling seasons. In that system, the room temperature control 40 comprises a direct acting thermostat 42 and a three-way valve 4, with associated actuator port 46, interconnected pneumatically as shown with the dashed lines between a season control air main and pneumatic actuators for valves 28 and 32. By way of example, thermostat 42 may be type LP-916, manufactured by Honeywell, Inc., Minneapolis, Minn. and valve 44 may be type R-404, manufactured by Robertshaw Controls Company, Richmond, Va. Valve 44 provides an air flow path as indicated in either FIG. 2 or 3, depending on the pressure applied to the actuator port 46 from the season control air main. Valve 28 is a normally open type VP527 proportional flow valve manufactured by Honeywell, Inc., operating in conjunction with an 8-13 psi actuator. The primary air flow control valve 32 is a type 101-AV-5"-LP-NC proportional flow valve manufactured by Mitco Corporation, Somerville, Mass., operating in conjunction with an 8-13 psi actuator. The valve 32 is substantially independent of pressure variations in primary air duct 16.

In this configuration with the season control air main pressure applied to the actuator port 46 at 22 psi, the valve 44 provides an air flow path between a vent port and the actuator of valve 28, thereby forcing that valve to its full open position and establishing "wild flow" of the reference liquid through core portion 22. The thermostat 42 is direct acting to apply a pressure to the valve 32 actuator in order to control the primary air flow through valve 32 as a function of temperature. With the season control air main applied to actuator port 46 at 18 psi, valve 44 provides an air flow path between the thermostat 42 and the actuator of valve 28, so that both valves 28 and 32 are thermostatically controlled. FIG. 4 illustrates both the reference liquid flow and the primary air flow as a function of the thermostat output air pressure (which is applied to the actuator of valve 32). Since valve 28 is forced to its full open state, the reference liquid flow is substantially constant throughout the range of operation of the system while the primary air flow ranges from 15% of maximum to its maximum value as the valve 32 control air pressure varies between 8 and 13 psi.

FIG. 5 similarly illustrates the reference liquid flow and primary air flow as a function of the thermostat output air pressure (which is applied to the actuators of both valves 28 and 32). When the thermostat air pressure is between 2 and 8 psi, the flow through valve 28 varies between its mimimum and maximum flow rate values, respectively, with substantially no flow when the pressure of the thermostat is above 8 psi. When the thermostat air pressure is between 8 and 13 psi, the primary air flow is controlled by valve 32 to vary between its minimum and maximum flow rate values. In this manner, a maximum range of temperature control is provided for thermostat air pressures between 2 and 13 psi.

In this exemplary embodiment, cooling season operation may be established by driving cold water through lines 15a, 15b and the core portion of heat exchanger 20, and maintaining the control air main at 22 psi. Similarly, heating season operation may be established by driving hot water through lines 15a, 15b and the core portion of heat exchanger 20, and maintaining the control air main at 18 psi. For these heating and cooling season configurations, FIGS. 4 and 5 illustrate the system operation where the reference liquid is cold water in FIG. 4 and is hot water in FIG. 5.

In other embodiments, different range actuators having different operational ranges may be selected for both of valves 32 and 28 so as to achieve varying degrees of overlap between the reference liquid flow and primary air flow control. In addition, alternative forms of control 40 may not utilize the switching valve 44 so that the differing seasonal operation may be controlled entirely by varying the temperature of the reference liquid. In such systems, the control 40 configuration is the same in both seasons and may be functionally equivalent to the embodiment illustrated in either FIGS. 2 or 3. Of course, multiple zone systems may utilize elements similar to blocks 18, 28, 32 and 40 which may be interconnected with lines 15a and 15b, duct 16 and reservoirs 12 and 14.

Figure 7:
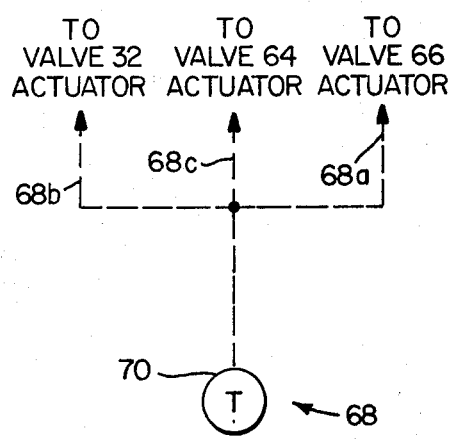
FIG. 7 shows in schematic form a zone temperature control of the embodiment of FIG. 6.

FIG. 6 illustrates a "4-pipe" induction ventilation system for a zone, wherein the zone temperature is established by a thermostatically controlled variable volume primary air flow control valve in conjunction with thermostatically controlled hot and cold reference liquid flow control valves. FIG. 7 illustrates an exemplary form of the zone temperature control of the system of FIG. 6. In FIGS. 6 and 7, elements which are substantially similar to corresponding elements in the FIG. 1 form of the invention, are identified by the same reference designation as their counterparts.

In FIG. 6, hot and cold reference liquid reservoirs and pumps, 60 and 62, respectively, each have a supply line 15a connected in series with a flow control valve (64 or 66), heat exchanger 20 and return line 15b. As in the FIG. 1 system, a primary air reservoir and fan 12 provides a supply of primary air via duct 16 and valve 32 through the induction unit 18 of zone 10. The zone temperature control 68 is interconnected with the valves 32, 64 and 66 by way of the pneumatic control lines 68a–68c. As shown in FIG. 7, the zone temperature control 68 comprises a direct acting thermostat 70 interconnecting the control air main with the control lines 68a–68c to valves 64, 66 and 32. For the illustrated embodiment, the valve 32 comprises a Mitco Valve No. 101-AV-5"-LP NC (a pressure independent variable flow control valve over input pressure ranges 8–13 psi), valve 64 is a normally open, liquid flow control valve (operative over the pressure range 3–7 psi), and valve 66 is a normally closed liquid flow control valve (operative over the pressure range 8–13 psi). In the illustrated system, hot and cold water are the reference liquids used.

Figure 8:
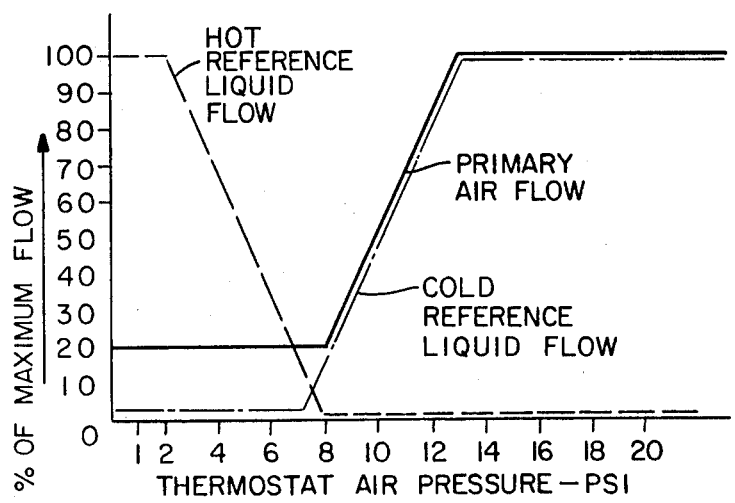
FIG. 8 illustrates the operation of the embodiment of FIGS. 6 and 7.

In operation, as illustrated in FIG. 8, during cooling periods, the air valve 32 and cold water valve 66 are modulated by the thermostat 70 to provide more or less cooling in order to meet the required cooling demand. Since maximum primary air is delivered only during periods with maximum cooling demands, the system minimizes the primary air requirements as compared with the prior art systems, and inherently providing relatively quiet operation, a further advantage over the prior art. A multiple zone system has the further advantage of allocating the primary air to those zones requiring maximum cooling while providing only relatively small amounts of primary air to zones requiring less than maximum cooling. Consequently, for a multiple zone system, the total system primary air requirement is relatively small compared with prior art systems, thereby reducing fan operating energy consumption.

During heating periods, the cold water valve 66 is closed, air valve 32 is throttled back to a predetermined minimum flow rate, and the hot water valve 64 is modulated to provide more or less heating in order to satisfy the zone heating demand. Since a minimum of primary air is used during the heating period, the re-heat air requirement is relatively small compared to prior art constant air volume systems. Furthermore, the reduced primary air usage also results in the use of smaller volumes of outside primary air, thereby yielding lower outside air heating requirements and lower fan power consumption.

It will be understood that a "three-pipe" system may operate in a similar manner to the four-pipe system illustrated in FIGS. 6 and 7, wherein the reference liquid supply lines are connected to a single return line. Otherwise, operation of this latter system is substantially similar to that described above for the system of FIGS. 6 and 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An induction ventilation system for one or more zones comprising, in combination:
   A. a plurality of heat exchangers, each exchanger being associated with a zone,
   B. means for passing a reference liquid from a reference liquid reservoir through said heat exchangers, C. a primary air injector associated with each heat exchanger, including means for injecting air at an adjustable primary air flow rate from a primary air reservoir, across the associated heat exchanger, and into the associated zone, whereby the temperature of said primary air is convectively modified by said heat exchanger, D. a secondary air inlet means associated with each heat exchanger, said inlet means being responsive to the flow rate of said injected primary air to induce a secondary air flow at a secondary air flow rate related to said primary air flow rate, said secondary air flow passing from said associated zone, across said associated heat exchanger and returning to said associated zone, whereby the temperature of said secondary air is convectively modified by said heat exchanger, and E. a zone temperature control including:
  i. selectively operative means associated with each heat exchanger to adjust the flow rate of said primary air into said zone whereby the heat capacity of the primary and secondary air entering said associated zone is related to said primary air flow rate,
  ii. a liquid flow rate control means operative in a first mode to maintain the flow rate of said reference liquid through at least one of said heat exchangers to be equal to a predetermined constant over the full range of variation of said primary air flow rate.

2. System in accordance with claim 1 having a thermostatic means associated with at least one zone for providing a signal representative of the temperature of its associated zone, and wherein said primary air flow rate adjusting means is responsive to said signal to adjust said primary air flow rate so that said zone temperature approaches a predetermined temperature.

3. A system in accordance with claim 2 further comprising means to maintain said reference liquid at a predetermined liquid temperature in said liquid reservoir, said liquid temperature being lower than said zone temperature.

4. A system in accordance with claim 2 further comprising means to maintain said reference liquid at a liquid temperature in said liquid reservoir, said liquid temperature being higher than said zone temperature.

5. The system in accordance with claim 1 wherein said liquid flow rate control means is operative in a second mode to ajust the flow rate of said reference liquid through said associated heat exchanger whereby the heat capacity of the primary and secondary air entering said associated zone is related to the reference liquid flow rate.

6. System in accordance with claim 5 having a thermostatic means associated with at least one zone for providing a signal representative of the temperature of its associated zone, and wherein said primary air flow rate adjusting means and said liquid flow rate control means are responsive in combination to said signal to adjust said primary air and reference liquid flow rates, respectively, so that said zone temperature approaches a predetermined temperature.

7. A system in accordance with claim 6 further comprising means to maintain said reference liquid at a predetermined liquid temperature in said liquid reservoir, said liquid temperature being lower than said zone temperature.

8. A system in accordance with claim 6 further comprising means to maintain said reference liquid at a liquid temperature in said liquid reservoir, said liquid temperature being higher than said zone temperature.

9. System in accordance with claim 1 wherein said primary air flow rate adjustment means includes a pressure independent variable flow control valve.

* * * * *